United States Patent [19]

Wojtowicz

[11] 4,416,864

[45] Nov. 22, 1983

[54] PROCESS FOR CALCIUM HYPOCHLORITE

[75] Inventor: John A. Wojtowicz, Cheshire, Conn.

[73] Assignee: Olin Corporation, New Haven, Conn.

[21] Appl. No.: 429,754

[22] Filed: Sep. 30, 1982

[51] Int. Cl.³ .................... C01B 11/06; C01F 11/24
[52] U.S. Cl. .................................................. 423/474
[58] Field of Search ........................................ 423/474

[56] References Cited

U.S. PATENT DOCUMENTS

| | | | |
|---|---|---|---|
| 1,583,421 | 5/1926 | Pistor | 423/474 |
| 1,754,473 | 4/1930 | MacMullin | 423/474 |
| 1,937,230 | 11/1933 | Kitchen | 423/474 |
| 1,937,613 | 12/1933 | Weber | 423/474 |
| 2,320,635 | 6/1943 | Mericola | 423/474 |
| 2,368,042 | 1/1945 | Robson | 423/474 |
| 2,374,835 | 5/1945 | Robson | 423/474 |
| 2,429,531 | 10/1947 | Soule | 423/474 |
| 2,441,337 | 5/1948 | Sprauer | 423/474 |
| 3,030,177 | 4/1962 | Mohan | 423/474 |
| 3,760,064 | 9/1973 | Droste | 423/474 |
| 3,895,099 | 7/1975 | Sakowski | 423/474 |
| 4,089,935 | 5/1978 | Waxelbaum | 423/474 |
| 4,146,578 | 3/1979 | Brennan | 423/474 |
| 4,147,761 | 4/1979 | Wojtowicz | 423/474 |
| 4,328,200 | 5/1982 | Welch | 423/474 |

FOREIGN PATENT DOCUMENTS

| | | | |
|---|---|---|---|
| 60125 | 9/1982 | European Pat. Off. | 423/474 |
| 60126 | 9/1982 | European Pat. Off. | 423/474 |
| 55-109202 | 9/1980 | Japan | 423/474 |
| 404627 | 1/1934 | United Kingdom | 423/474 |
| 487009 | 6/1938 | United Kingdom | 423/474 |

Primary Examiner—Brian E. Hearn
Attorney, Agent, or Firm—James B. Haglind; Donald F. Clements

[57] ABSTRACT

A process for producing calcium hypochlorite from lime containing insoluble impurities comprises reacting the lime with an aqueous solution of hypochlorous acid to form a reaction mixture comprised of coarse dibasic calcium hypochlorite crystals and fine insolubles comprised of fine dibasic calcium hypochlorite crystals, insoluble impurities, and unreacted lime. Coarse dibasic calcium hypochlorite crystals are separated from the reaction mixture, leaving a slurry comprised of an aqueous calcium hypochlorite solution containing fine insolubles. The slurry of fine insolubles is separated and the resulting clarified aqueous calcium hypochlorite solution is used to wash occluded fine insolubles from the coarse dibasic crystals. The resulting wash solution is combined with fine insolubles and the resulting slurry is reacted with hypochlorous acid and filtered to remove insoluble lime impurities. The clarified solution is mixed with the washed coarse dibasic calcium hypochlorite crystals and then reacted with an aqueous solution of hypochlorous acid to produce hemibasic calcium hypochlorite. The resulting slurry is reacted with an alkali metal hydroxide and chlorine to form an aqueous paste of calcium hypochlorite dihydrate crystals. The paste is then dried to produce granular calcium hypochlorite by spray drying or spray graining. The hypochlorous acid is produced by reacting an aqueous solution of an alkali metal hydroxide in finely divided form with gaseous chlorine.

14 Claims, No Drawings

PROCESS FOR CALCIUM HYPOCHLORITE

This invention relates to the manufacture of calcium hypochlorite. More particularly, this invention relates to an improved continuous process for the manufacture of calcium hypochlorite. Calcium hypochlorite is a commercial bleaching and sanitizing agent used particularly in the disinfection of swimming pools.

Calcium hypochlorite is commercially produced by the reaction of an aqueous slurry of lime with chlorinating agent such as chlorine. The lime employed is of a high purity as impurities normally found in lime are, when present in any significant amounts, deleterious to the calcium hypochlorite product. There are, however, relatively few natural sources of lime which meet the specifications required by commercial calcium hypochlorite processes. Further, these high purity limes, where available, bring a premium price and thus increase the cost of producing calcium hypochlorite. In addition, there are produced in commercial processes alkali metal chloride or alkaline earth metal chloride solutions containing small concentrations of calcium hypochlorite which are too dilute for recycle to the process or to concentrate or separate by means which are economically feasible, and which must be further treated before disposal by environmentally safe procedures.

The use of lime sources having considerable amounts of insoluble impurities in the production of calcium hypochlorite has been described, for example, in U.S. Pat. Nos. 2,320,635 and 3,895,099.

U.S. Pat. No. 2,320,635, issued to F. C. Mericola et al teaches a process for producing high test bleach in which low grade lime is reacted with chlorine to produce a slurry of insoluble lime impurities in a solution containing calcium hypochlorite and calcium chloride. The slurry is filtered to remove the impurities which are washed with water and disposed of as waste. The wash water is recycled to the chlorination reaction.

In U.S. Pat. No. 3,895,099, issued July 15, 1975, to W. J. Sakowski, a process is described in which lower grade lime sources may be employed which are initially reacted with chlorine to form a slurry of the insoluble impurities in a solution of calcium hypochlorite and calcium chloride. The insoluble impurities are removed from the solution, for example, by filtering and the purified filtrate is then employed in producing calcium hypochlorite. U.S. Pat. No. 3,895,099 also teaches the treatment of dilute calcium hypochlorite solutions with an alkali metal hydroxide to recover a highly pure lime.

In both of the above processes, unreacted lime is entrapped in the slurry of insoluble impurities which is not recovered, but discarded with the mud wastes. Effluents containing chloride and hypochlorite ions are generated which require treatment before disposal can be accomplished.

Japanese Patent Disclosure No. 121,901-1980 publicly disclosed on Sept. 19, 1980, by T. Murakami et al describes a method of removing insoluble impurities from slurries of calcium hypochlorite dihydrate in a classifier tank. As there is a considerable overlap between the particle size of the insoluble impurities and the calcium hypochlorite dihydrate crystals, efficient separation of the insoluble impurities by particle size classification methods is difficult to achieve.

The removal of iron from slurries of basic calcium hypochlorite crystals is described in U.S. Pat. No. 3,760,064, issued Sept. 18, 1973, to T. C. Droste, in a process which adds a salt of a metal of Group IIA, IIB, or silver to the slurry to form an insoluble iron compound. The insoluble iron compound is removed from the basic calcium hypochlorite crystals by employing a settling apparatus which provides a differential rate of settling. However, by converting a soluble iron impurity in the slurry to an insoluble impurity, this process introduces additional solids to be separated from the calcium hypochlorite crystals. In addition, inclusion of the metals employed into the finished calcium hypochlorite product is undesirable.

Also known are processes in which lime is reacted with a solution of hypochlorous acid to eliminate or minimize the presence of chloride ions in solutions or slurries of calcium hypochlorite and thus avoid the formation of effluents containing both hypochlorite and chloride ions which require disposal.

U.S. Pat. No. 1,481,039 issued to M. C. Taylor et al. forms a solution of hypochlorous acid in an organic solvent such as a mixture of ethyl alcohol and carbon tetrachloride, which is reacted with ground limestone to form a basic calcium hypochlorite salt.

Similarly, U.S. Pat. No. 3,578,393 issued to J. A. Wojtowicz et al. reacts slaked lime with a solution of hypochlorous acid in an organic solvent such as methyl ethyl ketone to prepare neutral calcium hypochlorite.

The use of organic solvents in producing chloride-free hypochlorous acid solutions increases process costs and the presence of organic materials as impurities in the calcium hypochlorite product is undesirable.

U.S. Pat. No. 2,429,531 issued to E. C. Soule et al. describes a process in which dibasic calcium hypochlorite or hemibasic calcium hypochlorite are prepared by known methods and reacted with hypochlorous acid solution to form calcium hypochlorite products. This process employs high grade limes and calcium chloride is present as an impurity at all stages of the process.

In U.S. Pat. No. 3,134,641, R. D. Gleichert teaches the reaction of an aqueous solution of hypochlorous acid with lime to produce a slurry of neutral calcium hypochlorite in which a sodium hypochlorite solution is added to the reaction mixture. The slurry is spray dried to produce granular calcium hypochlorite. The process, however, requires high grade lime and cannot effectively remove insoluble impurities from the slurries of calcium hypochlorite produced.

More recently, calcium hypochlorite has been prepared from chloride-free aqueous solutions of hypochlorous acid. The hypochlorous acid solutions are prepared by reacting gaseous chlorine with an aqueous solution of sodium hydroxide to form a gaseous mixture of HOCl, $Cl_2O$ and $Cl_2$ which is then contacted with water to dissolve the HOCl and the $Cl_2O$.

U.S. Pat. No. 4,147,761, issued Apr. 3, 1979, to J. A. Wojtowicz et al. describes a process in which gaseous hypochlorous acid is produced in a sweep reactor by passing chlorine gas rapidly across the surface of an agitated aqueous concentrated solution of sodium hydroxide. The reaction produces a gaseous phase, comprised of hypochlorous acid, chlorine monoxide, and unreacted chlorine, which is contacted with an aqueous medium to form an aqueous solution of hypochlorous acid. The liquid phase produced in the reaction is a slurry of sodium chloride particles in a solution of sodium hypochlorite solution. After removal of the sodium chloride, the sodium hypochlorite solution and the hypochlorous acid solution are reacted with lime to produce calcium hypochlorite.

In U.S. Pat. No. 4,146,578, issued Mar. 27, 1979, to J. P. Brennan et al., gaseous chlorine is reacted with an aqueous solution of an alkali metal hydroxide in a finely divided mist form at an elevated temperature to prepare hypochlorous acid.

Finely divided lime particles are reacted with the aqueous hypochlorous acid solution to form a slurry of insolubles in a solution of calcium hypochlorite. The slurry is filtered to remove the insolubles and the calcium hypochlorite solution is chlorinated in the presence of sodium hydroxide to form a slurry of neutral calcium hypochlorite suitable for spray drying or spray graining to produce granular calcium hypochlorite.

In the above processes, lime values present in the insoluble muds are not recovered and are discarded as waste.

There is need of a process for producing calcium hypochlorite in which low grade lime sources can be employed and in which lime values are recovered from the insoluble muds produced in the process.

It is an object of the present invention to provide a process for producing calcium hypochlorite in which insoluble impurities in lime are readily removed and from which lime values are recovered.

Another object of the present invention is to provide a process for producing calcium hypochlorite in which low grade lime sources can be employed.

An additional object of the present invention is to provide a process for producing basic calcium hypochlorite crystals in the absence of chloride ions as impurities.

These and other objects of the invention are accomplished in a process for preparing calcium hypochlorite from lime containing insoluble impurities which comprises:
- (a) reacting an aqueous solution of hypochlorous acid with the lime to form a reaction mixture comprised of dibasic calcium hypochlorite crystals, the insoluble impurities and unreacted lime;
- (b) separating the coarse dibasic calcium hypochlorite crystals from a slurry comprised of an aqueous calcium hypochlorite solution containing fine insolubles comprised of unreacted lime, fine crystals of dibasic calcium hypochlorite, and insoluble impurities;
- (c) separating said fine insolubles from said aqueous calcium hypochlorite solution;
- (d) washing said coarse dibasic calcium hypochlorite crystals with said aqueous calcium hypochlorite solution and recovering said wash solution;
- (e) recombining said fine insolubles with said wash solution to form a slurry of fine insolubles;
- (f) reacting said slurry of fine insolubles with an aqueous solutions of hypochlorous acid to produce additional calcium hypochlorite in solution;
- (g) separating the calcium hypochlorite solution from the remaining insoluble impurities;
- (h) reacting said calcium hypochlorite solution and hypochlorous acid with the washed dibasic calcium hypochlorite crystals to produce an aqueous paste of hemibasic calcium hypochlorite crystals;
- (i) reacting said aqueous paste of hemibasic calcium hypochlorite crystals with sufficient concentrated alkali metal hydroxide and sufficient chlorine to form a paste of neutral calcium hypochlorite dihydrate crystals; and
- (j) drying said aqueous paste of calcium hypochlorite dihydrate crystals to produce dry granular calcium hypochlorite.

More in detail, hypochlorous acid, substantially free of chlorine-containing anions such as chlorides or chlorates, is produced in a process in which gaseous chlorine is reacted with an aqueous solution of an alkali metal hydroxide in finely divided mist form at an elevated temperature sufficient to effect vaporization of hypochlorite acid as it forms, and separating the vaporized hypochlorous acid from the resulting solid alkali metal chloride product. This process is described in U.S. Pat. No. 4,146,578, issued Mar. 27, 1979, to J. P. Brennan, J. A. Wojtowicz and P. H. Campbell.

The process is carried out in a suitable reactor, such as one provided with means for spraying a finely divided mist of an aqueous solution of an alkali metal hydroxide into the reactor, generally near the top, means for feeding gaseous chlorine in or near the top thereof, means for withdrawing solid alkali metal chloride product from or near the bottom of the reactor, and means for withdrawing a vapor stream comprised of hypochlorous acid, unreacted chlorine and water from or near the bottom of the reactor. The reactor, reactant feed lines or both are provided with suitable heating means for maintaining the reaction at a temperature sufficiently high to vaporize the hypochlorous acid product and water.

Any alkali metal hydroxide capable of reacting with gaseous chlorine to form hypochlorous acid may be employed as a reactant in the process of this invention. Typical examples of suitable alkali metal hydroxide include sodium hydroxide, potassium hydroxide, lithium hydroxide and mixtures thereof. Sodium hydroxide is the preferred reactant since the resulting sodium chloride by-product is more easily disposed of than are the other alkali metal chlorides.

The alkali metal hydroxide is fed to the reactor as an aqueous solution or solid in finely divided form. It is preferable to employ the highest concentration of alkali metal hydroxide possible to minimize energy required to evaporate water from the solid alkali metal chloride product. Generally, the concentration of alkali metal hydroxide ranges from about 10 to about 80 and preferably from about 45 to about 70 percent alkali metal hydroxide by weight. More dilute or more concentrated solutions or slurries, or finely divided alkali metal hydroxide solids may be employed, if desired.

The reactor is provided with at least one atomizer for spraying the alkali metal hydroxide into the reactor, at or near the top. The atomizer forms a finely divided mist of the alkali metal hydroxide solution in the reactor for reaction with the gaseous chlorine contained therein. Droplet sizes which provide the maximum surface to volume ratio attainable are the preferred form of the alkali metal hydroxide solution. Droplets having an average diameter of less than about 1000 microns, perferably less than about 300 and more preferably less than about 100 microns are employed in the reaction. Any atomization technique capable of providing such droplets is employed to feed the aqueous alkali metal hydroxide solution to the reactor. Solid alkali metal hydroxide particles with the size range of the droplets may be employed.

Typical atomizing techniques of the pneumatic, hydraulic and spinning disc type, among others, which are suitable for use in the process of this invention, are described in the monograph entitled "Atomization and Spray Graining" by W. R. Marshall, Jr., Chemical Engineering Progress Monograph Series, No. 2, Vol. 50, 1954. A gas such as chlorine gas or an inert gas such as air, nitrogen or mixtures thereof under pressure is used to atomize droplets of aqueous alkali metal hydroxide by premixing before discharge from the nozzle, or mixing after discharge of the liquid and gas from their respective nozzles in a pneumatic atomizer. Sufficient chlorine gas to react with the alkali metal hydroxide may be mixed with an inert gas such as air or nitrogen and fed to the atomizer or to the reactor.

At least one atomizer is employed in the reactor which is positioned away from the reactor wall a sufficient distance to permit substantially complete reaction of the droplets of alkali metal hydroxide with chlorine before contacting the reactor walls. Any reactor design and atomizer position which permits reaction of the gas and droplets before contacting the wall or floor of the reactor may be employed, preferably with a minimum of residence time.

The atomizer is preferably positioned along the central axis of a cylindrical reactor, with minimum contact between the mist and the walls. The atomizer may be directed up, down, sideways or any other orientation that meets the above conditions.

For example, as described above, a spray of aqueous alkali metal hydroxide solution from an atomizer positioned in or near the top of the reactor is passed co-current with a flow of chlorine gas fed at or near the top of the reactor. In another embodiment, the aqueous alkali metal hydroxide solution is atomized with chlorine gas under pressure at or near the top of the reactor. The reactor is provided with a suitable grid to retain the solid alkali metal chloride particles which form, while permitting withdrawal of the vaporized hypochlorous acid from the bottom of the reactor. If desired, the gas and droplets may be fed at the bottom of the reactor and the gas is removed at the top. In another embodiment, the mixture of gas and solid may be conveyed from the reactor and separated in a separate container or apparatus, such as a cyclone or the like.

If the droplets are too large in diameter, there is a gradual decrease in the yield of the hypochlorous acid product. As indicated in the prior art, chlorinating an aqueous solution of caustic which is not in droplet form results in poor yields of hypochlorous acid because of the instability of the hypochlorous acid in the salt solution.

Gaseous chlorine is fed to the reactor at a rate sufficient to provide at least the stoichiometric proportion, and preferably a stoichiometric excess of chlorine above that proportion necessary to form hypochlorous acid with all of the alkali metal hydroxide present in the mist. Generally, from about 1 to about 20 and preferably from about 5 to about 10 times the stoichiometric proportion of chlorine is employed as a reactant.

The reactor is provided with heating means, either external or internal, which maintains the temperature in the reactor sufficiently high to vaporize the hypochlorous acid as it is formed. Generally, this temperature is at least 100° C. at atmospheric pressure. Although temperatures as high as 200° C. may be employed, it is preferable to employ temperatures in the range from about 75° C. to about 150° C. at atmospheric pressure or less. Lower temperatures may be employed at lower pressures. If the temperature is too low, the hypochlorous acid will remain in the droplets, in which phase it is highly unstable, thereby reducing the final yield of the desired hypochlorous acid.

The pressure in the reactor is generally maintained above the remainder of the system to provide sufficient head to convey vaporized hypochlorous acid from the reactor to a suitable scrubber which is capable of forming an aqueous solution of hypochlorous acid. Generally, the pressure in the reactor ranges from about 5 to about 100 psia, and preferably from about 10 to about 20 psia. However, higher or lower pressures may be employed if desired.

The hypochlorous acid vapors containing unreacted chlorine are withdrawn from the reactor as they are formed. These vapors are conveyed to a suitable scrubber where they are placed in countercurrent flow with water or other aqueous scrubbing solution to produce an aqueous hypochlorous acid solution containing from about 0.1 to about 12 and preferably from about 1 to about 7 molar hypochlorous acid. The gaseous phase discharged from the top of the scrubber contains unreacted chlorine, which may be recycled to the reactor for producing hypochlorous acid. The temperature of the scrubbing stage is generally maintained in the range from about 0° to about 30° C., and preferably from about 10° to about 15° C. At temperatures below about 9.6° C., there is a tendency for chlorine to form chlorine octahydrate which is insoluble in cold water and precipitates in the scrubber, which diminishes the proportion of recycled chlorine. Any convenient pressure may be employed in the scrubber, but a pressure less than the reactor pressure is required in order to provide sufficient pressure differential to convey the hypochlorous acid vapors from the reactor to the scrubber. If desired, two or more stages may be employed in the scrubbing operation, wherein the gaseous discharge from the first scrubber is conveyed to the bottom of a second scrubber for scrubbing with fresh solution. The enriched scrubber liquor discharged from the second scrubber is used as the scrubbing medium fed to the top of the first scrubber for scrubbing the hypochlorous acid vapors fed to the bottom of the first scrubber.

The aqueous solution of hypochlorous acid produced is reacted in a first reaction step with lime to produce dibasic calcium hypochlorite. The lime employed can be any suitable lime source having an active lime content of from about 85 to about 99 percent, where active lime is defined as the weight percent of $Ca(OH)_2$ in the lime. The lime employed includes impurities such as iron compounds, silica, aluminum salts, magnesium salts, manganese, unburned limestone (calcium carbonate and magnesium carbonate) and other compounds in trace quantities. These impurities represent from about 1 to about 15, and preferably from about 2 to about 8 percent by weight of the lime.

The reaction vessel employed in the first reaction step is equipped with a suitable agitator. The reaction is exothermic and therefore cooling is provided to maintain the reaction temperature below about 50° C., and preferably in the range of from about 15° to about 35° C.

A slurry of dibasic calcium hypochlorite crystals, insoluble impurities and unreacted lime particles in an aqueous calcium hypochlorite solution, which is substantially free of chloride ions, is continuously withdrawn from the reaction vessel. The slurry is conveyed to a first separator for separating the coarse dibasic calcium hypochlorite crystals from the slurry of fine insolubles comprised of fine dibasic calcium hypochlorite crystals, lime and insoluble impurities. Suitable separation means are any solid-liquid separator such as settling/decantation apparatus, an elutriator, or a filter. Preferred as a separator is an elutriator.

The slurry of fine insolubles is filtered, or otherwise separated in a second separator to obtain a clarified aqueous calcium hypochlorite solution which may be used to wash fine impurities from the coarse dibasic calcium hypochlorite crystals. The fine insolubles from the second separator may be recombined with the wash solution containing suspended fine impurities and conveyed to a second reaction step. Also added to the second reaction step is an aqueous hypochlorous acid solution which reacts with the unreacted lime and the fine dibasic crystals in the fine impurities to produce a slurry of insoluble impurities in an aqueous calcium hypochlorite solution substantially free of chloride ions. The slurry is fed to a third solid-liquid separator to separate the calcium hypochlorite solution from a mud comprised of insoluble lime impurities substantially free of lime and dibasic calcium hypochlorite crystals.

The calcium hypochlorite solution is fed to a third reaction step to which is added the washed coarse dibasic calcium hypochlorite crystals recovered from the first separator along with an aqueous solution of hypochlorous acid to form a reaction mixture of hemibasic calcium hypochlorite crystals in a calcium hypochlorite solution substantially free of chloride ions. The temperature of the reaction mixture in the third reaction step is maintained in the range of from about 15° to about 35° C.

The slurry of hemibasic calcium hypochlorite crystals from the third reaction step is reacted with chlorine in the presence of an alkali metal hydroxide such as sodium hydroxide to produce an aqueous paste of neutral calcium hypochlorite dihydrate crystals. The aqueous paste has a calcium hypochlorite concentration in the range of from about 20 to about 40, and preferably from about 24 to about 26 percent by weight of Ca(OCl)$_2$. The liquid phase is predominantly an aqueous solution of alkali metal halide such as sodium chloride and calcium hypochlorite. The aqueous paste may be further treated to recover the calcium hypochlorite product in dry granular form. One embodiment of this invention employs a spray dryer of the type described in U.S. Pat. No. 2,901,435, which issued Aug. 25, 1959, to H. L. Robson which is hereby incorporated by reference. An aqueous slurry of calcium hypochlorite is fed to a spray drying chamber and the resulting droplets are contacted with hot inert gas such as air. The slurry droplets are dried in the chamber by means of the heated gas having an inlet temperature in the range from about 200° to about 235° C. and an outlet temperature in the range from about 70° to about 95° C.

Of more recent origin is the drying method designated as "spray graining." This is also adaptable to the utilization of the aqueous paste of dihydrate crystals having a water concentration within the range of from about 45 to about 90 percent, and preferably from about 50 to about 60 percent by weight of water directly without the need for intermediate filtration.

During spray graining, volatilization of water occurs at high thermal efficiency and at high mass transfer rates in a compact drying system. The drying system is, therefore, not burdened with excessive additional costs for volatilizing the water in the neutral dihydrate slurry. Granulation occurs simultaneously with the volatilization of water so that there is no need for the additional costly operation of the mechanical system for compacting dry powder as is the case for the spray dried powder. Typical applications of the spray graining method for drying and granulating neutral crystalline slurries of the dihydrate crystals are described in the patents issued to W. C. Saeman (U.S. Pat. No. 3,969,546, issued July 13, 1976; U.S. Pat. No. 4,005,087, issued Jan. 25, 1977; U.S. Pat. No. 4,118,524, issued Oct. 3, 1978 and U.S. Pat. No. 4,276,349, issued June 30, 1981).

Using this technique, strong rounded multi-layered granules of calcium hypochlorite are prepared which resist degradation and dusting when subjected to severe handling conditions.

The granular calcium hypochlorite product of either the spray drying technique or the spray graining technique is further dried, if desired, in a conventional rotating dryer to produce a granular calcium hypochlorite product having a water content ranging from about 0.1 to about 15 and preferably from about 1 to about 12 percent by weight.

The novel process of the present invention produces highly pure dibasic calcium hypochlorite crystals and hemibasic calcium hypochlorite crystals from low grade lime sources. The process produces granular calcium hypochlorite particles directly from slurries of neutral calcium hypochlorite dihydrate crystals without requiring a liquid-solid separation treatment. Insoluble impurities present in lime sources are effectively isolated and removed while minimizing or eliminating the accompanying loss of lime and hypochlorite values. Further, the process does not generate effluents containing chloride ions or hypochlorite ions which require disposal nor does the process require a separation of calcium hypochlorite crystals from said crystals of an alkali metal chloride.

The following examples are presented to illustrate the invention without any intention of being limited thereby. All parts and percentages are by weight unless otherwise specified.

EXAMPLE 1

Fifty percent aqueous caustic solution was pumped to a spray nozzle via a peristaltic pump at 2.85 g/min. The caustic was atomized with gaseous chlorine fed via a rotameter at 9.5 g/min. The spray nozzle was positioned in the top of the cylindrical glass reactor. The reactor temperature was maintained at 120° C. by means of heating tape. The effluent gases from the reactor were scrubbed with water at 10° C. in a series of three scrubbers to produce aqueous HOCl at a total yield of 85%. The more concentrated HOCl solution from the first scrubber contained 27% HOCl. Lime (98.5% assay, 37.3 g, 0.496 mol) and 27% hypochlorous acid solution (64.3 g, 0.331 mol HOCl) were added alternately and intermittently over a 30-min. period to a small amount of H$_2$O in a stirred beaker while maintaining the reaction temperature at 25°–30° C. After a 15-min. post reaction period, the slurry was filtered through a coarse (110 μm) polypropylene cloth. The cloudy filtrate (28.2 g) containing suspended lime impurities was filtered through a fine (4–5 μm) glass frit and the clarified filtrate used to reslurry and wash the dibasic calcium hypochlorite crystals on the filter. This washing process was repeated three times. The fine insolubles (lime, fine dibasic calcium hypochlorite and lime impurities) from the fine fitration were slurried in a clarified filtrate and reacted with HOCl to a pH of about 10.0. The resultant slurry was filtered and the insoluble mud was discarded.

The clean dibasic crystals and 27% hypochlorous acid solution (64.3 g, 0.331 mol) were added alternately and intermittently to the clarified filtrate from filtration of the lime insolubles. To the resultant slurry of hemibasic calcium hypochlorite was added aqueous 50% NaOH (26.5 g, 0.331 mol) and the mixture chlorinated at about 25° C. to a final pH of about 10.0. The slurry of neutral Ca(OCl)$_2$ was vacuum dried at room temperature to about 20% H$_2$O content. The partially dried product was passed through a 16 mesh screen to break up lumps and dried further under vacuum at 50° C. to about 7% H$_2$O. Analysis is given in Table 1 of the major lime impurities remaining in the calcium hypochlorite product.

COMPARATIVE EXAMPLE A

Lime (98.5% assay, 37.3 g, 0.496 mol) and 27% hypochlorous acid solution (128.6 g, 0.661 mol) were added over a 30 minute period alternately and intermittently to a small volume of water in a stirred beaker while maintaining the pH above 10.0 and the temperature between 25° and 30° C. To the resultant slurry of hemibasic calcium hypochlorite was added 50% aqueous NaOH (26.5 g, 0.331 mol) and the mixture chlorinated (23.5 g, 0.331) to a pH of 10.0 while maintaining the temperature at about 25° C. The slurry of neutral Ca(OCl)$_2$ was vacuum dried at room temperature to about 20% H$_2$O content. The partially dried product was passed through a 16 mesh screen to break-up lumps and dried further under vacuum at 50° C. to about 7% H$_2$O. Analysis of major lime impurities remaining in the calcium hypochlorite product are given in Table 1.

TABLE 1

| Insoluble Lime Impurities | | |
|---|---|---|
| | Example 1 | Comparative Example A |
| % Si | 0.037 | 0.096 |
| % Mg | 0.033 | 0.092 |
| % Fe | 0.005 | 0.012 |
| % Al | 0.005 | 0.014 |

As shown in TABLE 1, the process of EXAMPLE 1 removed about 59–66% of the major insoluble lime impurities over the process of COMPARATIVE EXAMPLE A.

EXAMPLE 2

Lime (98.5% assay, 37.3 g, 0.496 mol) and 23.5% hypochlorous acid solution (73.9 g, 0.331 mol HOCl) were added alternately and intermittently over a 30-min. period to a small amount of H$_2$O in a stirred beaker while maintaining the pH above about 11.5 and the temperature at 25°–30° C. After a 15-min. post reaction period, the slurry was filtered through a coarse (110 μm) polypropylene cloth. The cloudy filtrate containing suspended dibasic hypochlorite fines and lime impurities was filtered through a fine (4–5 μm) glass frit and the clarified filtrate used to reslurry and was the dibasic calcium hypochlorite crystals on the filter. The washing/filtration cycle was repeated three times. The fine insolubles (lime, fine dibasic calcium hypochlorite and lime impurities) from the fine filtration were slurried in clarified filtrate and reacted with HOCl to pH of about 10.0. The resultant slurry was filtered and the insoluble mud discarded. The clean dibasic crystals and 23.5% hypochlorous acid solution (73.9 g, 0.331 mol) were added alternately and intermittently to the clarified filtrate from filtration of the lime insolubles. To the resultant slurry of hemibasic calcium hypochlorite was added aqueous 50% NaOH (26.5 g, 0.331 mol) and the mixture chlorinated at about 25° C. to a final pH of about 10.0. The slurry of neutral Ca(OCl)$_2$ was vacuum dried at room temperature to about 20% H$_2$O content. The partially dried product was passed through a 16 mesh screen to break-up lumps and dried further under vacuum at 50° C. to about 7% H$_2$O. Analysis of the product showed reduced impurities similar to those obtained in EXAMPLE 1.

What is claimed is:

1. A process for preparing calcium hypochlorite from lime containing insoluble impurities which comprises:
   (a) reacting an aqueous solution of hypochlorous acid with said lime to form a reaction mixture comprised of dibasic calcium hypochlorite crystals, said insoluble impurities and unreacted lime;
   (b) separating coarse dibasic calcium hypochlorite crystals from a slurry comprised of an aqueous calcium hypochlorite solution containing fine insolubles comprised of fine crystals of dibasic calcium hypochlorite, said unreacted lime and said insoluble impurities;
   (c) separating said fine insolubles from said aqueous calcium hypochlorite solution;
   (d) washing said coarse dibasic calcium hypochlorite crystals with said aqueous calcium hypochlorite solution and recovering said wash solution;
   (e) recombining said fine insolubles with said wash solution to form a slurry of fine insolubles;
   (f) reacting said slurry of fine insolubles with an aqueous solution of hypochlorous acid to produce additional calcium hypochlorite in solution;
   (g) separating the calcium hypochlorite solution from the remaining insoluble impurities;
   (h) reacting said calcium hypochlorite solution and hypochlorous acid with the washed dibasic calcium hypochlorite crystals to produce an aqueous paste of hemibasic calcium hypochlorite crystals;
   (i) reacting said aqueous paste of hemibasic calcium hypochlorite crystals with sufficient concentrated alkali metal hydroxide and sufficient chlorine to form a paste of neutral calcium hypochlorite dihydrate crystals; and
   (j) drying said aqueous paste of calcium hypochlorite dihydrate crystals to produce dry granular calcium hypochlorite.

2. A process for producing calcium hypochlorite from lime containing insoluble impurities which comprises:
   (a) reacting an aqueous solution of an alkali metal hydroxide in finely divided form with gaseous chlorine to form hypochlorous acid and a solid alkali metal chloride at an elevated temperature sufficient to vaporize said hypochlorous acid as it forms, separating said vaporized hypochlorous acid from said solid alkali metal chloride;
   (b) dissolving said vaporized hypochlorous acid in water to produce an aqueous solution of hypochlorous acid;
   (c) reacting said lime with said aqueous solution of hypochlorous acid to form a reaction mixture comprised of dibasic calcium hypochlorite crystals, the insoluble impurities and unreacted lime;
   (d) separating coarse dibasic calcium hypochlorite crystals from a slurry comprised of an aqueous calcium hypochlorite solution containing fine insolubles comprised of unreacted lime, fine crystals of dibasic calcium hypochlorite, and insoluble impurities;

(e) separating said fine insolubles from said aqueous calcium hypochlorite solution;

(f) washing said coarse dibasic calcium hypochlorite crystals with said aqueous calcium hypochlorite solution and recovering said wash solution;

(g) recombining said fine insolubles with said wash solution to form a slurry of fine insolubles;

(h) reacting said slurry of fine insolubles with an aqueous solution of hypochlorous acid to produce additional calcium hypochlorite in solution;

(i) separating the calcium hypochlorite solution from the remaining insoluble impurities;

(j) reacting said calcium hypochlorite solution and hypochlorous acid with said washed dibasic calcium hypochlorite crystals to produce an aqueous paste of hemibasic calcium hypochlorite crystals;

(k) reacting said aqueous paste with sufficient concentrated alkali metal hydroxide and sufficient chlorine to form a paste of neutral calcium hypochlorite dihydrate crystals; and (l) drying said aqueous paste of calcium hypochlorite dihydrate crystals to produce dry granular calcium hypochlorite.

3. The process of claim 1 or claim 2 in which said coarse dibasic calcium hypochlorite crystals and said calcium hypochlorite solution are admixed in a hemibasic reaction mixture to produce hemibasic calcium hypochlorite crystals.

4. The process of claim 3 in which an aqueous hypochlorous acid solution is fed to said hemibasic reaction mixture.

5. The process of claim 4 in which said hemibasic calcium hypochlorite crystals are reacted with chlorine in the presence of an alkali metal hydroxide solution to produce said neutral calcium hypochlorite dihydrate crystals.

6. The process of claim 2 in which said elevated temperature is in the range from about 75° to about 150° C.

7. The process of claim 5 wherein the pressure of the reaction between said chlorine and said alkali metal hydroxide in said finely divided form is maintained in the range from about 10 to about 20 psia.

8. The process of claim 6 wherein said finely divided form comprises droplets having an average diameter of less than about 1000 microns.

9. The process of claim 7 wherein said aqueous hypochlorous acid solution has a concentration of from about 0.1 to about 12 molar hypochlorous acid.

10. The process of claim 9 in which said aqueous paste of calcium hypochlorite dihydrate crystals comprises from about 20 to about 40 percent by weight of $Ca(OCl)_2$.

11. The process of claim 10 wherein said drying is effected by spray drying said aqueous slurry of calcium hypochlorite.

12. The process of claim 10 wherein said drying is effected by spray graining said aqueous slurry of calcium hypochlorite.

13. The process of claim 12 wherein said aqueous paste of calcium hypochlorite dihydrate crystals is adjusted to a water concentration within the range of from about 45 to about 90 percent by weight of water prior to spray graining.

14. The process of claim 13 wherein the concentration of said aqueous slurry of calcium hypochlorite is adjusted within the range of from about 50 to about 60 percent by weight of water prior to said spray graining.

* * * * *

UNITED STATES PATENT AND TRADEMARK OFFICE
CERTIFICATE OF CORRECTION

PATENT NO. : 4,416,864

DATED : November 22, 1983

INVENTOR(S) : John A. Wojtowicz

It is certified that error appears in the above-identified patent and that said Letters Patent is hereby corrected as shown below:

At Column 7, line 38, after "about" (second occurrence) delete "26" and insert --36--.

At Column 9, line 58, delete "was" and insert --wash--.

Signed and Sealed this

Eighth Day of May 1984

[SEAL]

Attest:

GERALD J. MOSSINGHOFF

Attesting Officer

Commissioner of Patents and Trademarks